(12) United States Patent
Cha

(10) Patent No.: US 8,055,917 B2
(45) Date of Patent: Nov. 8, 2011

(54) COMPUTER AND POWER SUPPLY METHOD THEREOF

(75) Inventor: Jae-deok Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 926 days.

(21) Appl. No.: 11/942,181

(22) Filed: Nov. 19, 2007

(65) Prior Publication Data

US 2008/0191555 A1  Aug. 14, 2008

(30) Foreign Application Priority Data

Feb. 9, 2007  (KR) .................. 10-2007-0013869

(51) Int. Cl.
*G06F 1/00* (2006.01)
*H02J 7/00* (2006.01)

(52) U.S. Cl. ........ 713/300; 320/106; 320/107; 320/128; 320/137

(58) Field of Classification Search .................. 713/300; 320/106, 107, 128, 137
See application file for complete search history.

(56) References Cited

U.S. PATENT DOCUMENTS

| | | | | |
|---|---|---|---|---|
| 5,517,396 A * | 5/1996 | Murata | ............... | 363/15 |
| 5,844,399 A * | 12/1998 | Stuart | ............... | 323/282 |
| 6,144,187 A * | 11/2000 | Bryson | ............... | 320/137 |
| 6,335,611 B1 * | 1/2002 | Sasaki | ............... | 320/134 |
| 6,418,037 B1 * | 7/2002 | Zhang | ............... | 363/15 |
| 6,466,464 B1 * | 10/2002 | Drobnik | ............... | 363/34 |
| 2003/0220026 A1 * | 11/2003 | Oki et al. | ............... | 439/894 |
| 2005/0057214 A1 * | 3/2005 | Matan | ............... | 320/101 |
| 2005/0189913 A1 * | 9/2005 | Vitanov et al. | ............... | 320/114 |
| 2005/0208344 A1 * | 9/2005 | Tan | ............... | 429/7 |
| 2005/0242772 A1 * | 11/2005 | Cha | ............... | 320/115 |
| 2005/0242786 A1 * | 11/2005 | Sawyers et al. | ............... | 323/211 |
| 2006/0232133 A1 * | 10/2006 | Cha | ............... | 307/23 |
| 2007/0025128 A1 * | 2/2007 | Cha | ............... | 363/125 |
| 2008/0048609 A1 * | 2/2008 | Kuhlmann et al. | ............... | 320/107 |
| 2008/0183229 A1 * | 7/2008 | Neumiller et al. | ............... | 607/5 |
| 2009/0044026 A1 * | 2/2009 | Li et al. | ............... | 713/300 |
| 2009/0289056 A1 * | 11/2009 | Suenaga et al. | ............... | 219/702 |

FOREIGN PATENT DOCUMENTS

CN  1350671 A  5/2002

(Continued)

OTHER PUBLICATIONS

CN Office Action issued Jan. 20, 2011 in CN Application 200810000797.X.

*Primary Examiner* — Vincent Tran
(74) *Attorney, Agent, or Firm* — Stanzione & Kim, LLP

(57) ABSTRACT

A computer includes a system unit which has a plurality of electronic components, a battery unit which supplies auxiliary electric power to the system unit, an adapter which receives a first alternating current (AC) electric power and outputs a second AC electric power; a rectifying unit which rectifies the second AC electric power and supplies a direct current (DC) electric power having a level higher than a minimum electric power level required to operate the system unit and lower than a charging electric power level required to charge the battery unit, to the system unit, a battery charging unit which charges the battery unit, and an electric power amplifying unit which amplifies the DC electric power that branches off from a point of an electric power supplying path between the rectifying unit and the system unit, and supplies a charging electric power to the battery charging unit.

21 Claims, 7 Drawing Sheets

FOREIGN PATENT DOCUMENTS

| | | |
|---|---|---|
| CN | 1691477 A | 11/2005 |
| JP | 11332130 | 11/1999 |
| JP | 2000-350458 | 12/2000 |
| JP | 2004-328853 | 11/2004 |
| KR | 2005-107712 | 11/2005 |
| WO | WO 2005058416 A1 * | 6/2005 |

* cited by examiner

COMPUTER AND POWER SUPPLY METHOD THEREOF

CROSS-REFERENCE TO RELATED APPLICATIONS

This application claims priority from Korean Patent Application No. 10-2007-0013869, filed on Feb. 9, 2007 in the Korean Intellectual Property Office, the disclosure of which is incorporated herein by reference in its entirety.

BACKGROUND OF THE INVENTION

1. Field of the Invention

The present general inventive concept relates to a computer and a power supply method thereof, and more particularly, to a computer and a power supply method thereof which can lower a range of an input electric power level supplied to a system unit thereof.

2. Description of the Related Art

A portable computer, such as a notebook computer and a personal digital assistant (PDA), having a battery attached thereto is widely utilized in that it can be carried and used as a mobile device. Generally, the computer uses an outer power source through an AC/DC adapter or conventional power devices, and also uses a battery as a secondary power source which can be recharged by an adapter.

FIG. 1A is a block diagram illustrating a conventional computer. As illustrated in FIG. 1A, the conventional computer is supplied with electric power of 19 V from an adaptor 1, and electric power of 6 to 8.4 V from a battery 2. Accordingly, a system unit 3 of the conventional computer receives an input electric power having a range of 6 to 19 V from the adapter 1 and the battery 2. As such a configuration has a large range of the input electric power, components, such as a metal oxide semiconductor field effect transistor (MOSFET) and an inductor, are required to have a large capacity when they are designed to output the same voltage, thus decreasing an overall efficiency and a battery life span.

To solve such a problem, narrow voltage direct current (NVDC) has been introduced. According to the NVDC, the electric power from the adapter 1 or the battery 2 is transformed into the level required to drive electronic components included in the system unit 3, thus decreasing the range of voltage level of the input electric power (VDC) inputted to a DC/DC converter 4.

However, as illustrated in FIG. 1B, a conventional NVDC causes a decrease in efficiency because the electric power received from the adapter 1 is not directly applied to the system unit 3 but applied via a battery charging unit 5. Also, the conventional NVDC requires a boost converter to step up the electric power received from the adapter 1 to the electric voltage level required for charging the battery 2.

SUMMARY OF THE INVENTION

The present general inventive concept provides a computer and a power supply method thereof which can rectify alternating current electric power to supply direct current electric power being higher than a minimum electric power level of a battery and lower than a charging electric power level of the battery to a system unit, and amplify the rectified direct current electric power to supply it to a battery charging unit, so that emission of electromagnetic waves from an adapter can be decreased and a more efficient NVDC can be realized.

The present general inventive concept also provides a computer and a power supply method thereof which can decrease heat generated by a DC/DC converter included in the system unit and increase battery use period.

Additional aspects and utilities of the present general inventive concept will be set forth in unit in the description which follows and, in unit, will be obvious from the description, or may be learned by practice of the present invention.

The foregoing and/or other aspects of the present general inventive concept can be achieved by providing a computer including a system unit which has a plurality of electronic components, a battery unit which supplies auxiliary electric power to the system unit, an adapter which receives a first alternating current (AC) electric power and outputs a second AC electric power, a rectifying unit which rectifies the second AC electric power and supplies a direct current (DC) electric power, whose level is higher than minimum electric power level required to operate the system unit and lower than a charging electric power level required for charging the battery unit, to the system unit, a battery charging unit which charges the battery unit, and an electric power amplifying unit which amplifies the DC electric power that branches off from a point of an electric power supplying path between the rectifying unit and the system unit, and supplies a charging electric power to the battery charging unit.

A level of the charging electric power may be twice as large as that of the DC electric power.

The computer may further include a power source selecting unit which selectively supplies the auxiliary electric power and the DC electric power to the system unit.

The adapter may include a rectifying circuit which rectifies the first AC electric power into a temporary DC electric power, and an inverter circuit which transforms the temporary DC electric power into the second AC electric power of high frequency.

The system unit may include a DC/DC converter which decreases the level of at least one of the DC electric power and the auxiliary electric power by a predetermined value.

The foregoing and/or other aspects of the present invention can also be achieved by providing a power supply method of a computer including a system unit which has a plurality of electronic components and a battery unit which supplies auxiliary electric power to the system unit, the power supply method including receiving a first AC electric power to output a second AC electric power, rectifying the second AC electric power to supply a DC electric power, which is higher than a minimum electric power level required to operate the system unit and lower than a charging electric power level required for charging the battery unit, to the system unit, amplifying the DC electric power which branches off from a point of an electric power supplying path where the electric power is supplied to the system unit, and supplying the amplified DC electric power to the battery unit as a charging electric power.

A level of the charging electric power may twice as large as that of the DC electric power.

The supplying the DC electric power to the system unit may further include selectively supplying the DC electric power and the auxiliary electric power to the system unit.

The receiving of the first AC electric power to output the second AC electric power may include rectifying the first AC electric power into a temporary DC electric power, and transforming the temporary DC electric power into an AC electric power of high frequency.

The supplying of the DC electric power and the auxiliary electric power may further include decreasing a level of at least one of the DC electric power and the auxiliary electric power by a predetermined value.

The foregoing and/or other aspects of the present invention can also be achieved by providing a computer including a system unit which has a plurality of electronic components, a first power source to supply a DC electric power to the system unit, a second power source to supply an auxiliary DC electric power to the system unit, and an electric power amplifying unit connected between the first power source and the second power source to amplify a second DC electric power to output a charging electric power to the second power source.

The first power source may include an adapter to generate an AC power and a rectifier to rectify the AC power to the DC electric power.

The electric power amplifying unit may be connected between the rectifier and the second power source to amplify the DC electric power to the charging electric power.

The electric power amplifying unit may be connected between the rectifier and the second power source to double a level of the second DC electric power to output the charging electric power.

The charging electric power may include a first voltage and a second voltage, and the second power source may include a battery unit and a battery charging unit to receive the first voltage and to generate the second voltage to the battery unit to charge the battery unit, so that the battery unit outputs a charged voltage as the auxiliary DC electric power to the system unit.

The electric power amplifying unit may amplify the second DC electric power to output the first voltage, and the first voltage may have a level higher than a level of the DC electric power.

The DC electric power and the second DC electric power may be a same.

The first power source may generate an AC electric power and rectifies the AC electric power to output the DC electric power, and the electric power amplifying unit may rectify the AC electric power to output the second DC electric power and amplify the second DC electric power to adjust a level of the second DC electric power according to a characteristic of the second power source.

The second power source may include a battery unit having one or more battery cells; and the characteristic of the second power source may include the number of the one or more battery cells.

The second power source may include a battery unit having one or more battery cells, and the electric power amplifying unit may amplify the second DC electric power according to a characteristic of the one or more battery cells to output the charging electric power to the battery unit of the second power source.

The characteristic of the second power source may include the number of the one or more battery cells.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1A:
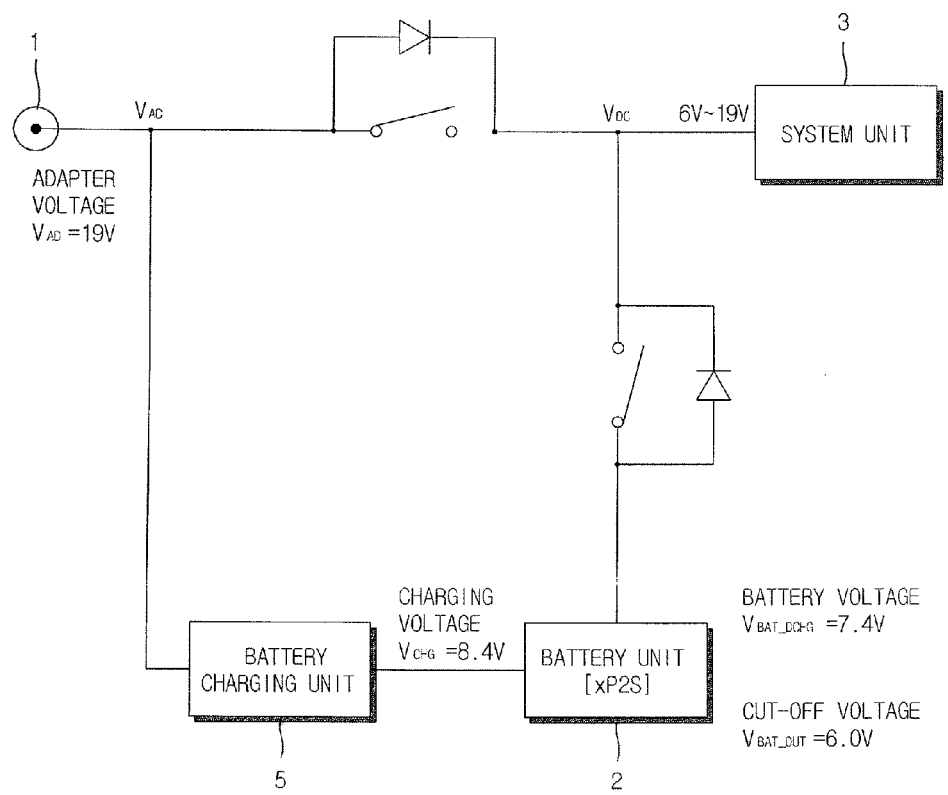
FIGS. 1A and 1B are block diagrams illustrating a conventional computer.
Figure 1B:
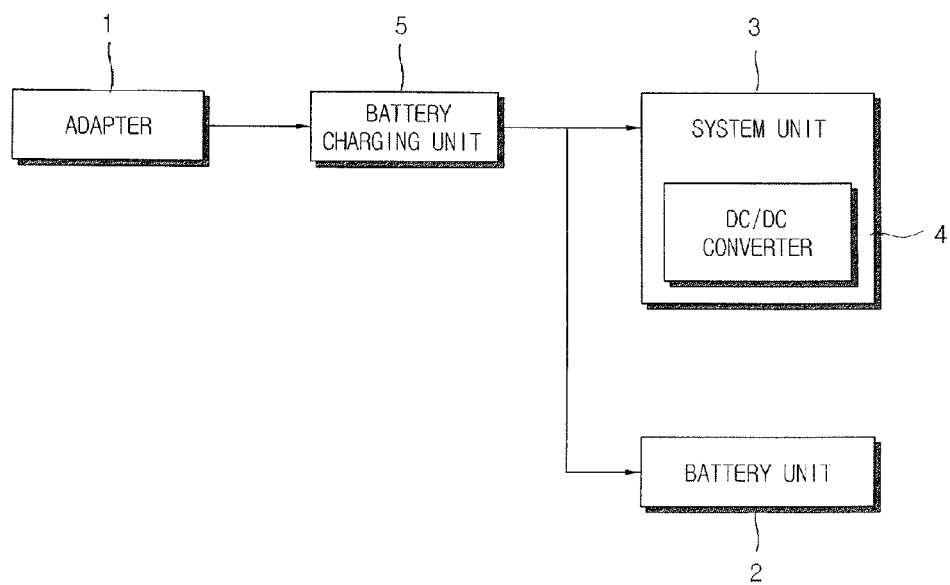

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

FIGS. 2A to 2D are block diagrams illustrating a computer 100 according to an exemplary embodiment of the present general inventive concept. As illustrating in FIG. 2A, the computer 100 according to the exemplary embodiment of the present general inventive concept includes a system unit 10, a battery unit 20, an adapter 30 as a power source, a rectifying unit 40, a battery charging unit 50, an electric power amplifying unit 60 and a power source selecting unit 70. The computer 100 may be embodied by a portable computer or conventional computers.

The system unit 10 has a plurality of electronic components to perform a main function of the computer 100 when an electric power is supplied. If the computer 100 according to the exemplary embodiment of the present general inventive concept is embodied by the portable computer, the electronic components of the system unit 10 may include a central processing unit (CPU), a random access memory (RAM), a chipset, a main board, a graphic card and other known electronic components in the art.

In this case, the system unit 10 may include a DC/DC converter 12 which converts and outputs the supplied electric power into an electric power having a voltage level required to drive each electronic component. The DC/DC converter 12 may include one or more switching voltage regulators to generate one or more electric power each having each voltage level. Each switching voltage regulator of the DC/DC converter 12 outputs the electric power of various voltage levels, for example, ±5 V, ±3.3 V, ±2.5 V or other voltage levels, that is required to drive each electronic component. The electric power of the various voltage levels outputted by the switching voltage regulator is supplied as the electric power required for each electronic component to operate and transmit signals as occasion demands.

The battery unit 20 supplies an auxiliary electric power to the system unit 10. The battery unit 20 according to this exemplary embodiment of the present general inventive concept is a battery as a secondary power source which can be charged by battery charging unit 50 and includes at least one battery cell having its specifications for charge and output voltages respectively. The battery unit 20 according to this exemplary embodiment is embodied by a two (2) Series (2S) battery having 2 battery cells. Also, as exemplary embodiments of the battery unit 20, a cut-off electric power level of each battery cell included in the battery unit 20 may be 3.0 V, a maximum electric power level outputted from the battery cell may be 3.7 V, and a charging electric power level required to charge each battery cell may be 4.2 V. Accordingly, the charging electric power level required to charge the battery unit 20 which is 2S battery is 8.4 V, and a range of the electric power level outputted from the battery unit 20 is 6.0 to 7.4 V.

The adapter 30 receives a first alternating current (AC) electric power and outputs a second AC electric power. As illustrated in FIG. 2B, the adapter 30 according to this exemplary embodiment of the present general inventive concept includes a rectifying circuit 32 which rectifies the first AC electric power into a temporary direct current (DC) electric power, and an inverter circuit 34 which converts the temporary DC electric power into the second AC electric power of a high frequency through a high frequency switching circuit. The level of the second AC electric power outputted by the inverter circuit 34 may be lowered by a predetermined ratio, and a transformer that can be insulated and of an adjustable winding turn ratio may be further included to lower a level of the second AC electric power.

In this case, the first AC electric power is commercial AC electric power, and a range of an electric power level inputted to the system unit 10 is 6.0 to 8.4 V if the computer 100 uses the 2S battery. Also, if the level of the second AC electric power is 5 V, a level of a DC electric power rectified from the second AC electric power becomes 7.07 V, thus satisfying the range of the electric power level inputted into the system unit 10. As the adapter 30 according to the exemplary embodiment of the present general inventive concept outputs the second AC electric power, electromagnetic interference (EMI) can be minimized compared to the adapter that outputs the DC electric power.

The rectifying unit 40 rectifies the second AC electric power received from the adapter 30 and supplies the DC electric power, whose level is higher than the minimum electric power level required to operate the system unit 10 and lower than the charging electric power level required to charge the battery unit 20, to the system unit 10. As illustrated in FIG. 2C, the rectifying unit 40 according to an exemplary embodiment of the present general inventive concept includes a plurality of diodes and a capacitor to rectify the second AC electric power into the DC electric power.

As described above, in a case of the 2S battery, the level of the minimum electric power required to operate the system unit 10 is 6.0 V, and the level of the charging electric power required to charge the battery unit 20 is 8.4 V. Accordingly, the rectifying unit 40 receives the second AC electric power of 5 V and outputs the DC electric power of 7.07 V.

The battery charging unit 50 charges the battery unit 20. The battery charging unit 50 according to an exemplary embodiment of the present general inventive concept may include a voltage transforming unit which transforms the electric power having its voltage level outputted by the adapter 30 into the electric power having the voltage level required to charge the battery unit 20.

Figure 2A:
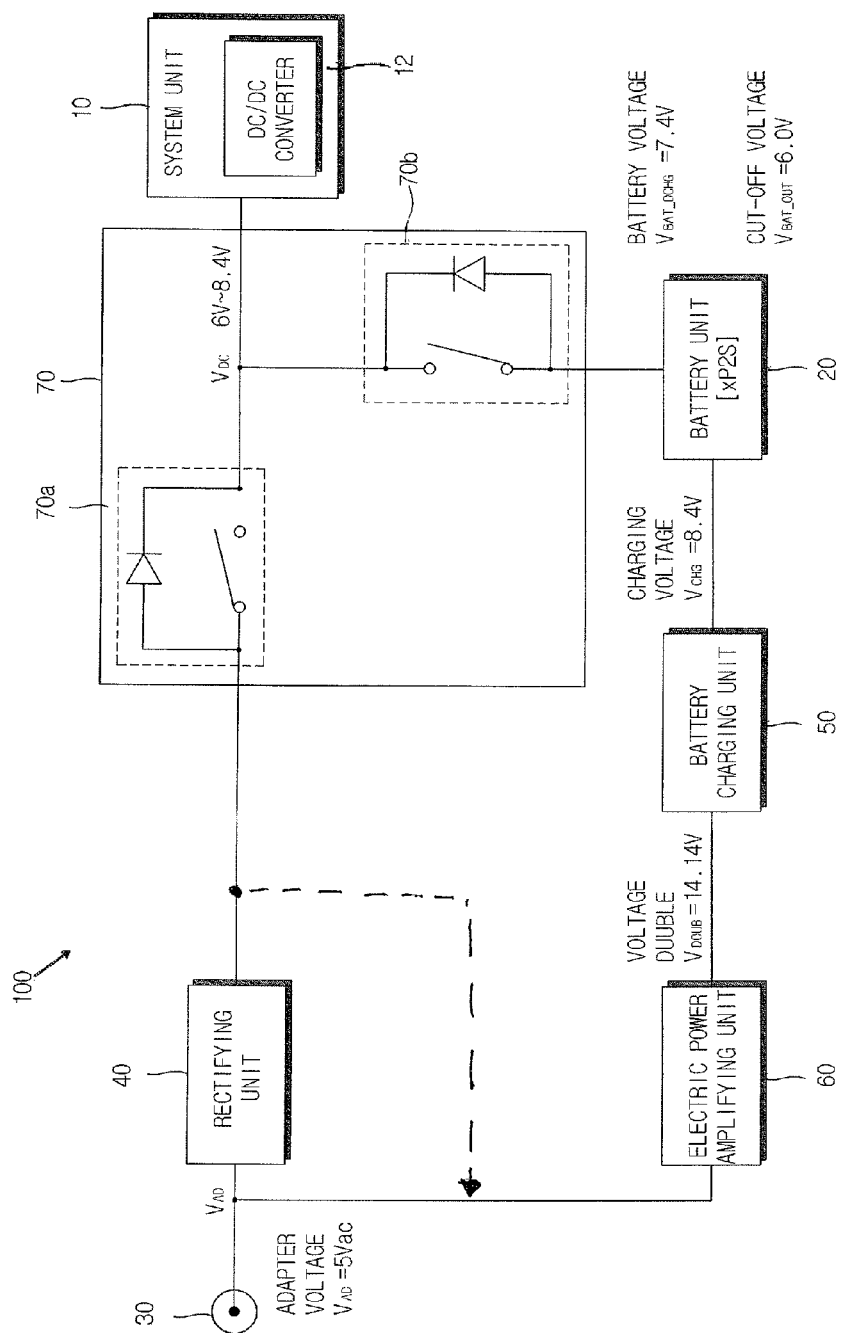
FIGS. 2A to 2D are block diagrams illustrating a computer according to an exemplary embodiment of the present general inventive concept.
Figure 2B:
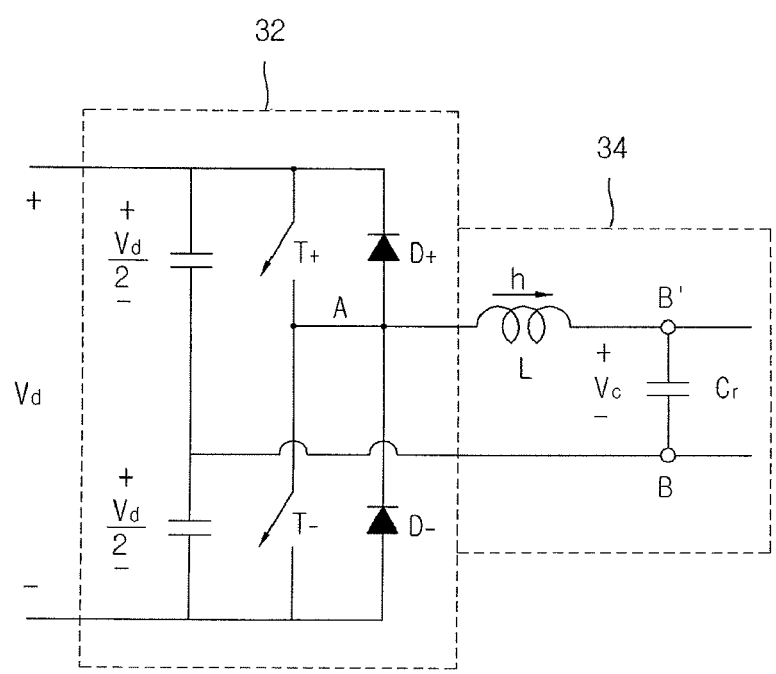
Figure 2C:
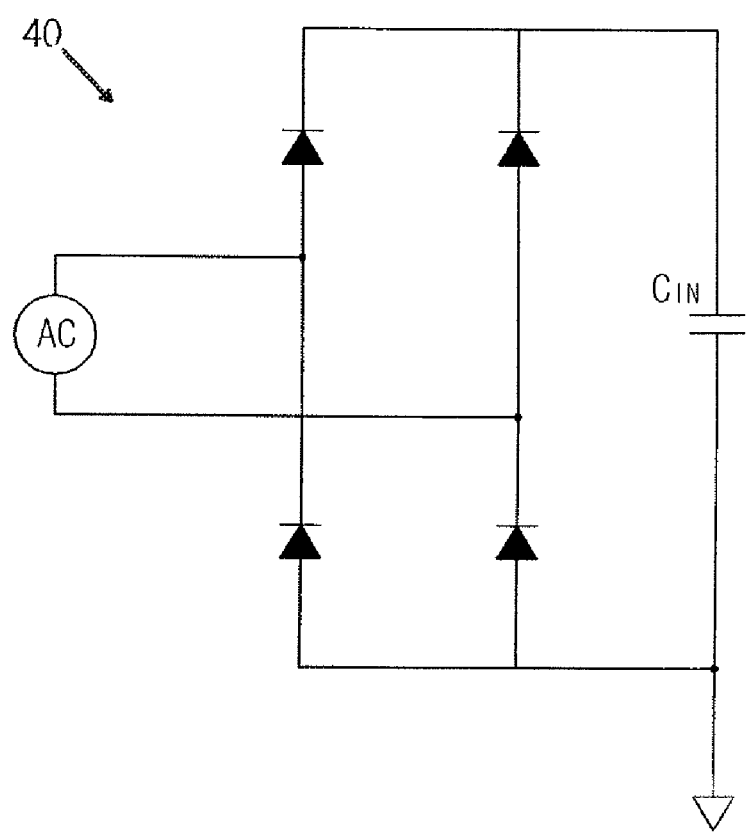

The electric power amplifying unit 60 is connected to the adapter 30 to receive the second AC electric power of 5 V from the adapter 30, as illustrated in FIG. 2A. In this case, the electric power amplifying unit 60 may include an additional or internal rectifier to rectify the received second AC electric power to generate a DC electric power, and amplify the DC electric power to supply the amplified DC power to the battery charging unit 50. However, it is possible that the electric power amplifying unit 60 is connected to an output terminal of the rectifying unit 40, as illustrated with a dotted line between the rectifying unit 40 and the electric power amplifying unit 60 in FIG. 2A, to receive the DC electric power from the rectifying unit 40 and to amplify the received DC electric power to output the amplified DC electric power to the battery charging unit 50.

Figure 2D:
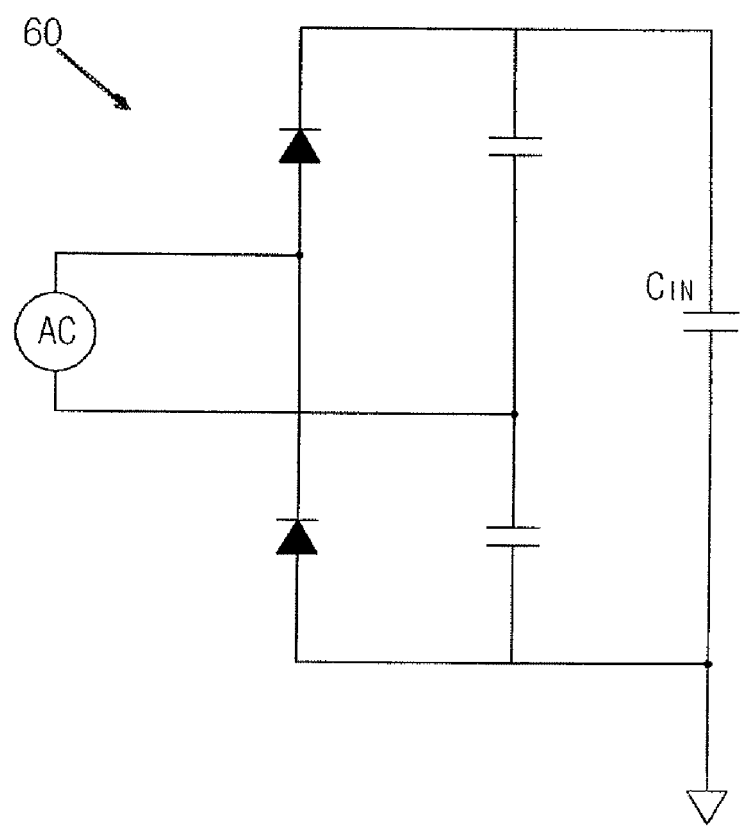

The electric power amplifying unit 60 amplifies the DC electric power branching off from a point of an electric power supplying path between the rectifying unit 40 and the system unit 10 and supplies the charging electric power to the battery charging unit 50. As shown in FIG. 2D, the electric power amplifying unit 60 according to the exemplary embodiment of the present general inventive concept may be embodied by a voltage doubler which doubles the level of the DC electric power outputted by the rectifying unit 40.

If the voltage level of the second AC electric power outputted by the adapter 30 is 5 V, the electric power amplifying unit 60 according to the exemplary embodiment of the present general inventive concept receives the DC electric power of the voltage level of 7.07 V rectified by the rectifying unit 40 and amplifies the received DC electric power into a second DC electric power of 14.14 V.

Also, if the computer 100 according to the exemplary embodiment of the present general inventive concept uses a 3S battery, then the cut-off electric power level of the battery unit 20 is 9.0 V, the maximum electric power level outputted by the battery unit 20 is 11.1 V, and the charging electric power level required to charge the battery unit 20 is 12.6 V. Therefore, for example, if the voltage level of the AC electric power outputted by the adapter 30 is adjusted to be 7 V, the voltage level of the DC electric power rectified by the rectifying unit 40 becomes 9.898 V, so that the DC electric power higher than the cut-off electric power level of the battery unit 20 and lower than the charging electric power level required to charge the battery unit 20 can be supplied to the system unit 10.

Also, the voltage level of the DC electric power amplified by the electric power amplifying unit 60 becomes 19.796 V. Therefore, the DC electric power having its level higher than 12.6 V, which is outputted from the battery charging unit 50 to charge the battery unit 20, can be supplied. In the exemplary embodiment of the present general inventive concept, the output electric power level of the adapter 30 has been explained to be 7 V when the computer 100 uses the 3S battery. However, any other configuration may be applicable when it enables the electric power having its level higher than the cut-off electric power level and lower than the charging electric power level of the battery unit 20 to be supplied to the system unit 10.

In either case of the 2S battery or the 3S battery, the adaptor may output the second AV electric power to correspond to the voltage level to be rectified and supplied to the system unit 10 and to be amplified and supplied to the battery charging unit 50.

The power source selecting unit 70 selectively supplies the auxiliary electric power outputted by the battery unit 20 and the DC electric power outputted by the rectifying unit 40 to the system unit 10. The power source selecting unit 70 according to the exemplary embodiment of the present general inventive concept may include a first switching unit 70a which switches a flow of the DC electric power outputted by the rectifying unit 40, and a second switching unit 70b which switches a flow of the auxiliary electric power outputted by the battery unit 20. In this case, the DC electric power is outputted from the rectifying unit 40 when the first switching unit 70a is turned on and the second switching unit 70b is turned off, and the auxiliary electric power is outputted from the battery unit 20 when the first switching unit 70a is turned off and the second switching unit 70b is turned on, thus preventing collision of the electric power supplied to the system unit 10 from the rectifying unit 40 and the battery unit 20.

Figure 3:
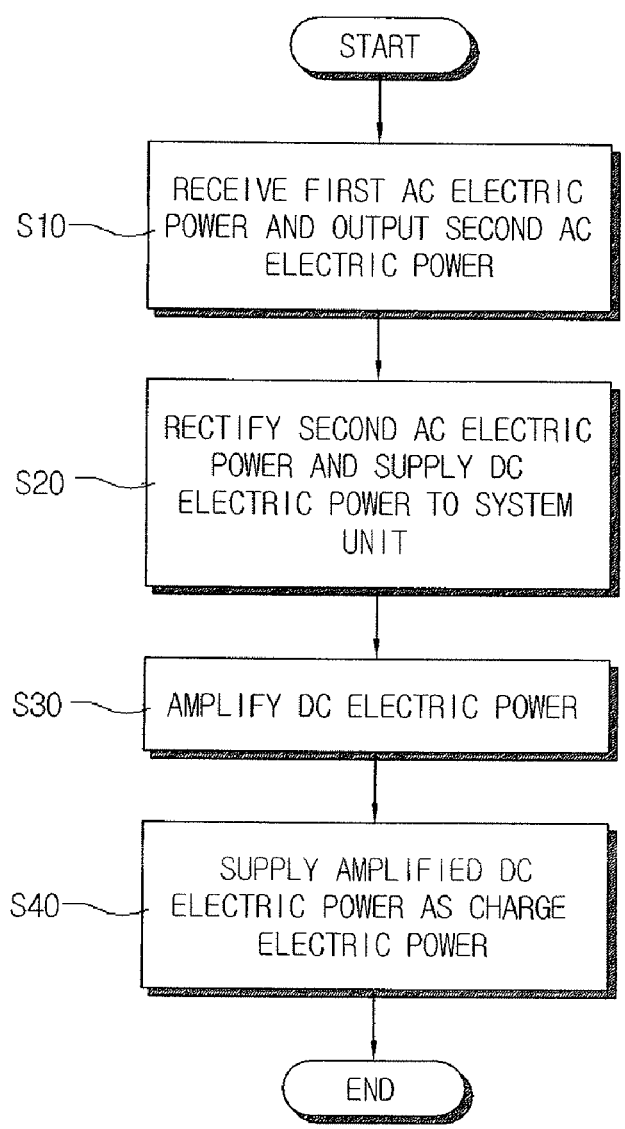
FIG. 3 is a flowchart describing a power supply method of a computer according to an exemplary embodiment of the present general inventive concept.

Hereinafter, a power supply method of the computer 100 according to an exemplary embodiment of the present general inventive concept will be described with reference to FIGS. 2A through 3.

The adapter 30 receives the first AC electric power and outputs the second AC electric power at operation S10. In this case, the first AC electric power is commercial AC electric power, and the range of the electric power level inputted to the system unit 10 is 6.0 to 8.4 V when the computer 100 uses the 2S battery. Therefore, the second AC electric power may have its level of 5 V. Also, operation S10 may include an operation of rectifying the first AC electric power into the temporary DC electric power using the rectifying circuit 32, and an operation of transforming the rectified temporary DC electric power into the second AC electric power of high frequency using the inverter circuit 34.

The second AC electric power outputted at operation S10 is rectified by the rectifying unit 40, and the DC electric power which is higher than the minimum electric power level required to operate the system unit 10 and lower than the charging electric power level required to charge the battery unit 20 is supplied to the system unit 10 at operation S20. In this case, operation S20 may further include an operation of selectively supplying the DC electric power rectified by the rectifying unit 40 and the auxiliary electric power outputted by the battery unit 20 to the system unit 10. Also, the power source selecting unit 70 may include the first switching unit 70a and the second switching unit 70b. In this case, operation S20 may further include an operation of outputting the DC electric power from the rectifying unit 40 when the first switching unit 70a is turned on and the second switching unit 70b is turned off, and an operation of outputting the auxiliary electric power from the battery unit 20 when the first switching unit 70a is turned off and the second switching unit 70b is turned on.

The DC electric power, which branches off a point of the electric power supplying path where the electric power is supplied from the adapter 30 to the system unit 10, is amplified by the electric power amplifying unit 60 at operation S30. The amplification at S30 may be performed by the voltage doubler which doubles the DC electric power level.

On the other hand, operations S20 and S40 are operations of supplying the electric power to the system unit 10 respectively. Therefore, operation S20 may be performed after operations S30 and S40 have been performed, or operations S20 and S40 may be performed at the same time.

The DC electric power amplified at operation S30 is supplied to the battery unit 20 as the charging electric power at operation S40. In this case, operation S40 may further include an operation of decreasing at least one of the DC electric power rectified by the rectifying unit 40 and the auxiliary electric power outputted by the battery unit 20 by a predetermined value using the DC/DC converter 12 included in the system unit 10.

As described above, according to the computer and the power supply method of the computer according to an exemplary embodiment of the present general inventive concept, the AC electric power is rectified, the DC electric power being higher than the minimum electric power level of the battery unit and lower than the charging electric power level of the battery unit is supplied to the system unit, and the rectified DC electric power is amplified and supplied to the battery charging unit, so that emission of electromagnetic waves from the adapter can be decreased and a more efficient NVDC can be realized.

Also, according to the computer and the power supply method of the computer according to an exemplary embodiment of the present general inventive concept, heat generated by the DC/DC converter included in the system unit can be decreased and a battery use period can be increased.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A computer comprising:
    a system unit which has a plurality of electronic components;
    a battery unit which supplies an auxiliary electric power to the system unit;
    an adapter which receives a first alternating current (AC) electric power and outputs a second AC electric power;
    a rectifying unit which rectifies the second AC electric power and supplies a direct current (DC) electric power having a level higher than a minimum electric power level required to operate the system unit and lower than a charging electric power level required to charge the battery unit, to the system unit;
    a battery charging unit which charges the battery unit; and
    an electric power amplifying unit which amplifies the DC electric power that branches off from a point of an electric power supplying path between the rectifying unit and the system unit, and supplies a charging electric power to the battery charging unit,
    wherein the level of the second AC electric power outputted by the adapter is lowered by a predetermined ratio.

2. The computer of claim 1, wherein a level of the charging electric power is twice as large as that of the DC electric power.

3. The computer of claim 2, further comprising:
    a power source selecting unit which selectively supplies the auxiliary electric power and the DC electric power to the system unit.

4. The computer of claim 3, wherein the system unit comprises a DC/DC converter which decreases the level of at least one of the DC electric power and the auxiliary electric power by a predetermined value.

5. The computer of claim 1, wherein the adapter comprises a rectifying circuit which rectifies the first AC electric power into a temporary DC electric power, and an inverter circuit which transforms the temporary DC electric power into the second AC electric power of high frequency.

6. A power supply method of a computer comprising a system unit which has a plurality of electronic components and a battery unit which supplies auxiliary electric power to the system unit, the power supply method comprising:
    receiving a first AC electric power to output a second AC electric power;
    rectifying the second AC electric power to supply a DC electric power having a level higher than a minimum electric power level required to operate the system unit and lower than a charging electric power level required to charge the battery unit, to the system unit;
    amplifying the DC electric power which branches off from a point of an electric power supplying path where the electric power is supplied to the system unit; and
    supplying the amplified DC electric power to the battery unit as a charging electric power,
    wherein the level of the second AC electric power is lowered by a predetermined ratio.

7. The power supply method of claim 6, wherein a level of the charging electric power is twice as large as that of the DC electric power.

8. The power supply method of claim 7, wherein the supplying of the DC electric power to the system unit further comprises selectively supplying the DC electric power and the auxiliary electric power to the system unit.

9. The power supply method of claim 8, wherein the supplying of the DC electric power and the auxiliary electric power further comprises decreasing a level of at least one of the DC electric power and the auxiliary electric power by a predetermined value.

10. The power supply method of claim 8, wherein the receiving of the first AC electric power to output the second AC electric power comprises rectifying the first AC electric power into a temporary DC electric power, and transforming the temporary DC electric power into an AC electric power of high frequency.

11. A computer comprising:
a system unit which has a plurality of electronic components;
a first power source to supply a DC electric power to the system unit,
wherein the first power source comprises an adapter to generate an AC electric power and a rectifier to rectify the AC power to the DC electric power;
a second power source to supply an auxiliary DC electric power to the system unit; and
an electric power amplifying unit connected between the first power source and the second power source to amplify the DC electric power to output a charging electric power to the second power source,
wherein the level of the AC electric power input into the first power source is lowered by a predetermined ratio.

12. The computer of claim 11, wherein the electric power amplifying unit is connected between the rectifier and the second power source to amplify the DC electric power to the charging electric power.

13. The computer of claim 11, wherein the electric power amplifying unit is connected between the rectifier and the second power source to double a level of the second DC electric power to output the charging electric power.

14. The computer of claim 11, wherein:
the charging electric power comprises a first voltage and a second voltage; and
the second power source comprises a battery unit and a battery charging unit to receive the first voltage and to generate the second voltage to the battery unit to charge the battery unit, so that the battery unit outputs a charged voltage as the auxiliary DC electric power to the system unit.

15. The computer of claim 14, wherein the electric power amplifying unit amplifies the second DC electric power to output the first voltage, and the first voltage has a level higher than a level of the DC electric power.

16. The computer of claim 11, wherein the DC electric power and the second DC electric power are a same.

17. The computer of claim 11, wherein:
the first power source generates an AC electric power and rectifies the AC electric power to output the DC electric power; and
the electric power amplifying unit rectifies the AC electric power to output the second DC electric power and amplifies the second DC electric power to adjust a level of the second DC electric power according to a characteristic of the second power source.

18. The computer of claim 17, wherein:
the second power source comprises a battery unit having one or more battery cells; and
the characteristic of the second power source comprises the number of the one or more battery cells.

19. The computer of claim 11, wherein:
the second power source comprises a battery unit having one or more battery cells; and
the electric power amplifying unit amplifies the second DC electric power according to a characteristic of the one or more battery cells to output the charging electric power to the battery unit of the second power source.

20. A method of supplying power to a computer having a system unit which has a plurality of electronic components, the method comprising:
supplying a DC electric power to the system unit with a first power source,
wherein the first power source comprises an adapter to generate an AC electric power and a rectifier to rectify the AC power to the DC electric power;
supply an auxiliary DC electric power to the system unit with a second power source;
and amplifying the AC electric power to output a charging electric power to the second power source with an electric power amplifying unit that is connected between the first power source and the second power source,
wherein the level of the AC electric power is lowered by a predetermined ratio.

21. A method of supplying power to a computer having a system unit which has a plurality of electronic components, the method comprising:
receiving a first alternating current (AC) electric power and outputting a second AC electric power with an adapter;
rectifying the second AC electric power and supplying a direct current (DC) electric power having a level higher than a minimum electric power level required to operate the system unit and lower than a charging electric power level to charge a battery unit, to the system unit; and
amplifying the DC electric power that branches off from a point of an electric power supplying path between the rectifying unit and the system unit with an amplifier, and supplying a charging electric power to the battery charging unit,
wherein the level of the second AC electric power outputted by the adapter is lowered by a predetermined ratio.

* * * * *